J. T. LISTER.
SYSTEM OF PROPULSION.
APPLICATION FILED NOV. 7, 1910.
1,095,967.
Patented May 5, 1914.
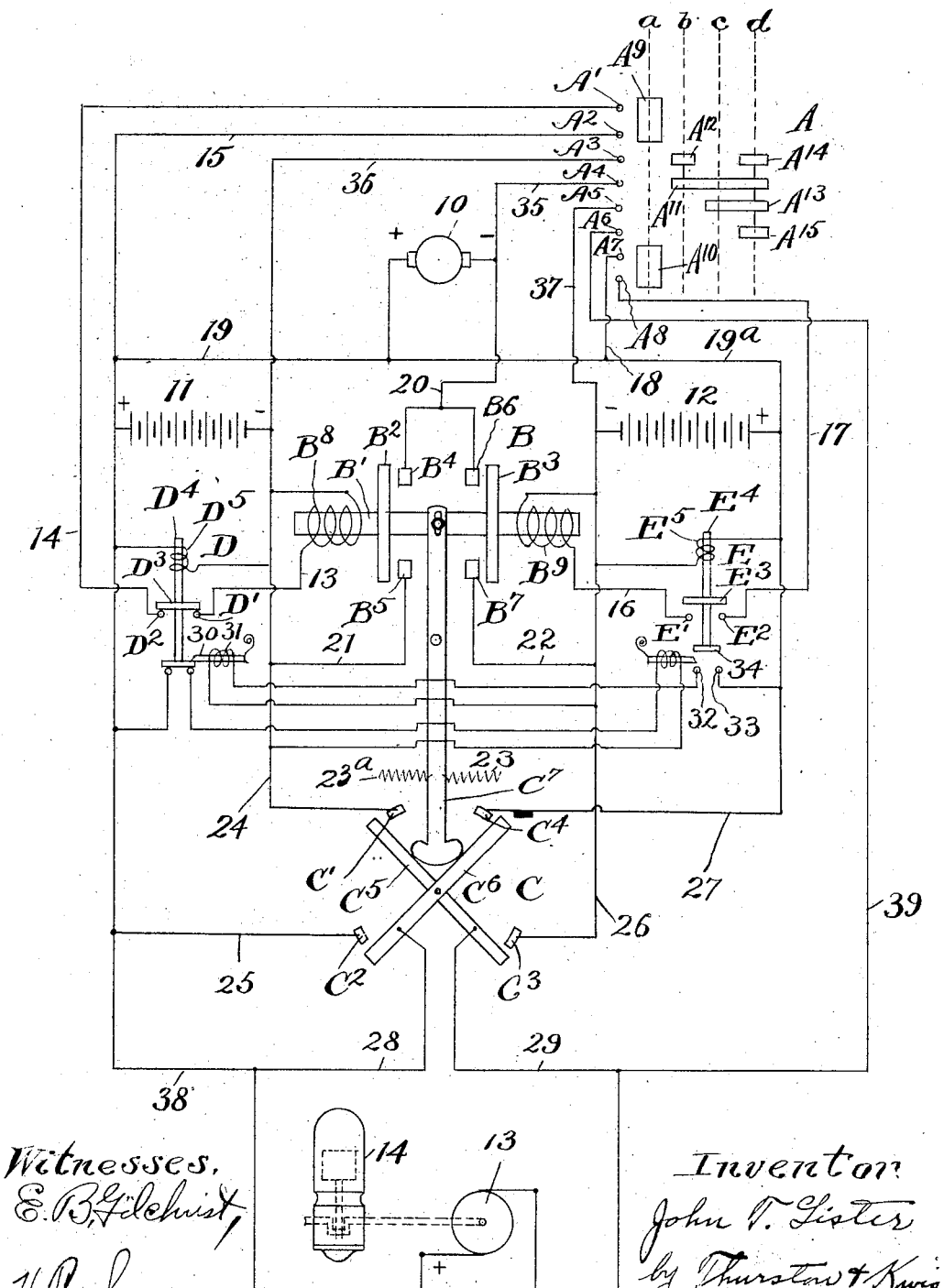

UNITED STATES PATENT OFFICE.

JOHN T. LISTER, OF CLEVELAND, OHIO, ASSIGNOR TO THE TURBINE MOTOR ELECTRIC CAR COMPANY, A CORPORATION OF OHIO.

SYSTEM OF PROPULSION.

1,095,967.

Specification of Letters Patent. Patented May 5, 1914.

Application filed November 7, 1910. Serial No. 590,983.

*To all whom it may concern:*

Be it known that I, JOHN T. LISTER, a citizen of the United States, residing at Cleveland, in the county of Cuyahoga and State of Ohio, have invented a certain new and useful Improvement in Systems of Propulsion, of which the following is a full, clear, and exact description.

This invention relates to systems of propulsion for electric vehicles and has for its main object the provision of a system of propulsion including a motor and two sets of storage batteries which are under normal conditions adapted to be connected alternately to the motor and to a charging device, together with means whereby under abnormal conditions, such as when the vehicle is going up a grade or is passing along a heavy road, more power can be supplied to the motor than is available in either set of batteries.

More particularly, the invention aims to provide a system of propulsion including a driving motor, two sets of batteries, an engine-driven generator, switching devices, preferably automatically operated, for alternately connecting one set of batteries to the motor for driving purposes and the other to the generator for charging purposes, and a controller which serves as a master switch and which when in one operative position connects in the switching devices which automatically control the connections of the batteries to the motor and generator respectively, and when turned beyond the first step to other operative positions disconnects the automatic switching devices and connects either of the sets of batteries to the motor independently of the other set or of the generator, or connects both batteries and the generator in parallel to the motor, so that all the available power of the vehicle is at once utilized for propulsion purposes.

These and other objects are accomplished by my invention which may be briefly summarized as consisting in certain novel combinations and arrangements of parts which will be described in the specification and set forth in the appended claims.

The single figure of the drawing shows diagrammatically a system embodying the preferred form of my invention.

Referring now to the drawing, 10 represents a direct current driving motor which may be geared to the vehicle in the usual manner. The motor 10 is normally supplied with current from one of two sets of storage batteries 11 and 12 which under normal conditions are adapted to be connected alternately to the motor and to a small generator 13 which is preferably driven by an internal combustion engine 14.

For the purpose of connecting the battery set singly to the motor and to the generator or for manually connecting either set of batteries to the motor, or all the batteries and the generator in parallel to the motor, and for the purpose of automatically controlling the connections of the batteries to the motor and generator respectively, I employ a controller A, preferably of the drum type, and two main switches, one a double throw automatic switch B, and the other a double throw switch C which, in this case is mechanically connected to the switch B, and is operated by the latter. The controller has in this instance four operative positions indicated by the dotted lines $a$, $b$, $c$ and $d$, and is provided with eight contact fingers designated respectively $A^1$ to $A^8$, and with contact segments designated $A^9$ to $A^{15}$. The segment $A^9$ engages and bridges the contact fingers $A^1$ to $A^2$ and the segment $A^{10}$ bridges the contact fingers $A^7$ and $A^8$ when the controller is in its first operative position $a$; the segment $A^{11}$ engages the contact finger $A^4$ when the controller is in the positions $b$, $c$ and $d$; the segment $A^{13}$ engages the contact finger $A^5$ when the controller is in the positions $c$ and $d$, and the segments $A^{14}$ and $A^{15}$ engage the contact fingers $A^3$ and $A^6$ respectively when the controller is in position $d$. Furthermore, the segments $A^{11}$ to $A^{15}$ are so connected that when the controller is in position $b$ contact fingers $A^3$ and $A^4$ are bridged; when the controller is in position $c$, contact fingers $A^4$ and $A^5$ are bridged; and when the controller is in the position $d$, contact fingers $A^3$ to $A^6$ are bridged or electrically connected.

The automatic double throw switch B which is designed to automatically connect and disconnect the battery sets 11 and 12 and the motor, includes a core or plunger $B^1$ carrying two bridging contact members $B^2$ and $B^3$, the former of which is designed to engage and bridge two stationary contacts $B^4$ and $B^5$, when the switch is thrown to one position, and the latter of which is designed to engage and bridge two stationary contacts $B^6$ and $B^7$ when the switch is thrown to the opposite position. The switch is adapted to be thrown to the right or to the left by two solenoid coils $B^8$ and $B^9$, the former of which is adapted to be connected across the terminals of battery set 11, and the latter of which is adapted to be connected across the terminals of battery set 12. The energization and deënergization of these two coils is controlled primarily by the controller and also by two relay switches D and E, the former having contacts in the circuit of the coil $B^8$ and the latter having contacts in the circuit of the coil $B^9$. As shown in the drawings, one terminal of the coil $B^8$ is connected directly to the negative side of battery set 11, and the other terminal is connected by a conductor 13 to one terminal or contact $D^1$ of the relay switch D, the other terminal or contact $D^2$ of which is connected by a conductor 14 to the contact finger $A^1$ of controller A. Contact finger $A^2$ of the controller is connected by a conductor 15 to the positive side of battery set 11. In a similar manner one terminal of solenoid coil $B^9$ is connected directly to the negative side of battery set 12 and the other terminal of the coil is connected by conductor 16 to one terminal $E^1$ of relay switch E, the other terminal $E^2$ of which is connected by conductor 17 to contact finger $A^3$ of the controller. Controller contact finger $A^7$ is connected by a conductor 18 to the positive side of battery set 12.

The contacts $D^1$ and $D^2$ of relay switch D and the contacts $E^1$ and $E^2$ of relay switch E are adapted to be bridged respectively by bridging contacts $D^3$ and $E^3$ carried by plungers $D^4$ and $E^4$ adapted to be actuated by small voltage coils $D^5$ and $E^5$, the former being connected across the terminals of battery set 11, and the latter being connected across the terminals of battery set 12. These relay switches are so designed and adjusted that when the controller is in position $a$ and when the voltage of either battery set drops to a predetermined value, the core and bridging contact of the corresponding relay switch drops so as to bridge the corresponding terminals and thereby energize one of the main coils $B^8$ or $B^9$, and at the same time the opposite relay switch is raised or opened so as to deënergize the other main coil.

It will be noted that the positive terminals of both sets of batteries are connected by conductors 19 and $19^a$ respectively to the positive side of motor 10 and the negative side of motor 10 is connected by suitable conductors which may be designated as a whole by the reference character 20 to two stationary contacts $B^4$ and $B^6$ of the automatic double throw switch B. Also the contacts $B^5$ and $B^7$ are connected by conductors 21 and 22 respectively to the negative sides of battery set 11 and battery set 12.

Double throw switch C includes two sets of stationary contacts $C^1$, $C^2$, $C^3$ and $C^4$, and two movable blades insulated from each other, and designated $C^5$ and $C^6$ respectively, these blades being adapted to be thrown by a switch lever $C^7$ which is mechanically connected to the plunger $B^1$ of switch B so that the blades will engage when in one position two stationary contacts $C^1$ and $C^2$, and when in another position contacts $C^3$ and $C^4$. When both solenoids $B^8$ and $B^9$ are deënergized, (such as when the controller A is in "off" position) both the switch B and the switch C are thrown to off or neutral position with the bridging contacts or blades out of engagement with all the stationary contacts, the two switches being thrown to neutral position by a pair of centralizing springs 23 and $23^a$. Stationary contacts $C^1$ and $C^2$ of switch C are connected respectively by conductors 24 and 25 to the negative and positive sides of the battery set 11, and the stationary contacts $C^3$ and $C^4$ are connected respectively by conductors 26 and 27 to the negative and positive sides of battery set 12. Furthermore, the switch blades $C^5$ and $C^6$ are connected respectively by conductors 28 and 29 to the positive and negative sides and terminals of the generator 13.

The result of the construction and arrangement so far described is that when the controller is in off or neutral position as shown in the drawing, both solenoid coils of the switch B are deënergized or on open circuit, regardless of the positions of the relay switches D and E. Consequently, both switches B and C are in off position, and the batteries are both disconnected from the motor 10 and generator 13. When, however, the controller is moved to position $a$ or to the first operative position, controller segments $A^9$ and $A^{10}$ respectively bridge contact fingers $A^1$ and $A^2$ and contact fingers $A^7$ and $A^8$. The circuits of the solenoid coils $B^8$ and $B^9$ may now be completed by the relay switches D and E. Assuming that the voltage of battery set 11 is slightly below a predetermined value, relay switch D is closed and the bridging contact of this switch closes the circuit through the solenoid coil $B^8$, which being thus energized, throws switch B to the left, as viewed in the drawing, bridging the stationary contact $B^6$ and $B^7$ and connecting battery set 12 to the motor. When the switch B is in the position stated, the positive side of battery set 12 is connected by conductor $19^a$ to the positive side of the motor, and the negative side of the motor is connected by conductor 20, switch contacts $B^6$, $B^3$ and $B^7$, conductor 22 and conductor 26 to the negative side of the battery. The battery set 12 therefore drives the motor and is being discharged. At the same time that switch B is thrown to the position referred to, switch C is actuated so as to connect the generator 13 to battery set 11 so that this battery set will now be charged. The positive side of the generator is then connected by conductors 28 and 25 to the positive side of battery set 11, and the negative side of the latter is connected by conductor 24, switch contacts $C^1$ $C^5$ and conductor 29 to the negative side of the generator. In a similar manner, when the positions of the relay switches D and E are reversed, or when the plunger of switch D is raised, and the plunger of switch E is lowered, the positions of the two switches B and C are reversed and battery set 11 is connected to the motor so as to drive the same, and battery set 12 is connected to the generator.

To avoid having the battery set, which is supplying current to the motor, being disconnected therefrom by the opposite relay switch opening prematurely and before the voltage of the battery set which is connected to the motor drops to the predetermined value sufficient to cause the closure of its relay switch, I have provided means whereby when a relay switch is closed by the drop in voltage of the corresponding battery set, said switch will be retained in closed position, until the other set of batteries which is connected to the motor is discharged to a point such that its voltage reaches the low limit which determines the closure of the relay switch corresponding thereto. Each of the relay switches D and E is in this case designed to be engaged and held in closed position until the other relay switch is closed by means of a spring pressed latch 30 which is adapted to be withdrawn from engagement with the relay switch by a coil 31 which is connected across the terminals of the opposite battery set and is designed to be energized or to have its circuit completed when the opposite relay switch is lowered or closed, the coil having in its circuit a pair of stationary contacts 32 and 33 which are bridged on the closure of the opposite relay switch by a bridging contact member 34 on the lower end thereof. With this arrangement when one battery set is connected to the motor, and the other to the generator, the relay switch corresponding to the battery set connected to the generator will be in closed position, as shown at the left hand side of the drawing, and the relay switch corresponding to the battery set connected to the motor will be opened or raised, as shown at the right hand side of the drawing. The closed relay switch will therefore remain closed until the voltage of the discharging battery set reaches a value such that its relay switch will be closed, whereupon the latch retaining the previously closed relay switch in closed position is withdrawn, permitting that relay switch to open, the energization of the small coil controlling the latter being now sufficient to open the same. This, of course, causes the battery which was previously connected to the motor to be connected to the generator, and the battery which was previously connected to the generator to be connected to the motor.

The coils $D^5$ and $E^5$ controlling the relay switches D and E may be quite small so that there is little current passing through the same, and these relay switches will be so adjusted that each will be closed on a very small drop in voltage of the corresponding battery set. In other words, the range of voltage difference between the battery discharging and the battery being charged will be small. The purpose will appear presently. Thus, with the controller in the position $a$, it is seen that the battery sets are automatically connected to the motor and to the generator respectively, and when one battery is discharged to a predetermined point, it is connected to the generator to be again charged. However, in case the automatic mechanism should for any reason get out of order, or if, for any cause, it is desired not to utilize the same, I have provided means in the controller whereby either battery set may be employed for driving the motor independently of the generator and of the automatic connecting and disconnecting mechanism. This is accomplished as follows: The negative side or terminal of the motor 10 is connected by a conductor 35 to contact finger $A^4$ which, as before stated, is engaged by contact segment $A^{11}$ when the controller is in position $b$, $c$ and $d$. Also contact finger $A^3$ which is engaged by segment $A^{12}$ when the controller is in position $b$ and by segment $A^{14}$ when the controller is in position $d$, is connected by conductor 36 to the negative side of battery set 11. Also contact finger $A^5$ which is engaged by segment $A^{13}$ when the controller is in position $c$ and position $d$ is connected by conductor 37 to the negative side of battery set 12. Therefore, it will be seen that when the controller is moved from position $a$ to position $b$, coils $B^8$ and $B^9$ of switch D are deënergized by having their circuits broken at the controller, regardless of whether or not the relay switches D and E are closed, and at the same time, battery set 11 is connected independently of the switch B to the motor 10. In a similar manner when the controller is moved to position $c$, battery set 11 is disconnected from the motor and battery set 12 is connected thereto. It will be seen also that when the controller is turned to position $d$, inasmuch as contact fingers $A^3$ and $A^4$ and $A^5$ are engaged by segments $A^{14}$, $A^{11}$ and $A^{13}$, both sets of batteries will be connected in parallel to a motor 10, thus supplying to the motor more power than is available in either set of batteries. I prefer, however, when the two batteries are connected in parallel to the motor, that the generator be connected also to the motor so as to supply the greatest possible power thereto. For this purpose, the positive side of generator 13 is connected by conductors 38 leading directly to the positive side of the motor, this connection being independent of the switch C. Also the negative side of the generator is connected by conductor 39 to contact finger $A^7$ of the controller, which is engaged by segment $A^{15}$ when the controller is in position $d$. Therefore, inasmuch as the segments $A^{13}$, $A^{14}$ and $A^{15}$ are electrically connected to segment $A^{11}$, both sets of batteries and the generator are connected in parallel to the motor, when the controller is in position $d$ or in the last operative position.

As before stated, the relay switches D and E are so adjusted as to be sensitive to slight changes in voltage, with the result that the voltage of one set of batteries is never materially greater or materially less than the maximum voltage of the other set. Furthermore, the voltage of the generator is made such that it is substantially the same as the voltage of the two battery sets. Consequently, both battery sets and the generator can be connected in parallel to the motor without any danger of one feeding current to another. Even if it is desired that the voltage of the generator for charging purposes be slightly above the maximum desired voltage of the batteries, the resistance of the connections of the generator to the controller may be such that the effective voltage of the generator at the controller will be substantially that of the batteries.

Having thus described my invention, what I claim is:—

1. In a battery system, a translating device, two sets of storage batteries for supplying the current to the translating device, a generator for charging the batteries, and switching devices for connecting the batteries separately and alternately to the translating device and to the generator respectively, and for connecting both batteries in parallel to the translating device.

2. In a battery system, a translating device, two sets of batteries for supplying current to the translating device, a generator for charging the batteries, switching mechanism for automatically connecting the batteries separately and alternately to the translating device and generator respectively so that one will supply current to the translating device while the other is being charged, and switching mechanism for connecting the batteries in parallel to the translating device.

3. In a battery system, two sets of batteries, a translating device, a generator, automatic devices for connecting the translating device and generator separately and alternately to the two batteries so that while one is driving the motor the other is being charged, and a controller for connecting the batteries and the generator in parallel to the translating device.

4. In a battery system, two sets of storage batteries, a translating device, a generator, switching means for connecting the batteries alternately to the translating device and to the generator, automatic mechanism controlling the same, and a controller for rendering inoperative the automatic mechanism and for connecting either set of batteries to the translating device independently of the other set.

5. In a battery system, a translating device, two sets of storage batteries for supplying current to the translating device, a generator for charging the batteries, switching means for connecting the batteries alternately to the translating device and to the generator, automatic mechanism controlling the same, and a manually operable controller for rendering inoperative the automatic mechanism and for connecting the batteries in parallel to the translating device.

6. In a battery system, two sets of storage batteries, a translating device, a generator, switching means for connecting the batteries alternately to the translating device and to the generator, automatic mechanism controlling the same, and a controller for rendering inoperative the automatic mechanism and for connecting the batteries and generator in parallel to the translating device.

7. In a battery system, two sets of storage batteries, a translating device, a generator, switching mechanism for connecting the batteries alternately to the translating device and to the generator so that while one is supplying current to the translating device the other is being charged by the generator, automatic devices operative upon voltage changes in the batteries for controlling the operation of the switching mechanism and therefore of the connections of the batteries to the translating device and the generator, and a manually operable controller for rendering operative or inoperative the automatic devices and for connecting either set of batteries to the translating device independently of the other set.

8. In a battery system, two sets of storage batteries, a translating device, a generator, switching mechanism for connecting the batteries alternately to the translating device and to the generator so that while one is supplying current to the translating device the other is being charged by the generator, automatic devices operative upon voltage changes in the batteries for controlling the operation of the switching mechanism, and a manually operable controller for rendering operative or inoperative the automatic devices and for connecting the batteries in parallel to the translating device.

9. In a battery system, two sets of storage batteries, a translating device, a generator, switching mechanism for connecting the batteries alternately to the translating device and to the generator so that while one is supplying current to the translating device the other is being charged by the generator, automatic devices operative upon voltage changes in the batteries for controlling the operation of the switching mechanism, and a manually operable controller for rendering operative or inoperative the automatic devices, and for connecting both sets of batteries and generator in parallel to the translating device.

10. In a battery system, two sets of storage batteries, a translating device, a generator, switching mechanism for connecting the batteries alternately to the translating device and to the generator so that while one is supplying current to the translating device the other is being charged by the generator, automatic devices operative upon voltage changes in the batteries for controlling the operation of the switching mechanism, and a manually operable controller for rendering operative or inoperative the automatic devices, for connecting either set of batteries to the translating device independently of the other set and of said switching mechanism, and for connecting both sets of batteries and generator in parallel to the translating device.

11. In a battery system, a translating device, two sets of batteries for supplying current to the translating device, a generator for charging the batteries, automatic switching mechanism for connecting the batteries separately and alternately to the translating device and to the generator, and manually operable switching mechanism for connecting each set of batteries to the translating device independently of the other set, or for connecting both sets in parallel to the translating device.

12. In a battery system, a translating device, two sets of batteries for supplying current to the translating device, and a controller which when in one position connects one set of batteries to the translating device independently of the other set, when in another position connects the second set of batteries to the translating device independently of the first set, and when in another position connects both sets of batteries in parallel to the translating device.

13. In a battery system, a translating device, two sets of batteries for normally supplying current alternately and separately to the translating device, a generator for charging the batteries, and a manually operable controller which when in one position connects one set of batteries to the translating device independently of the other set, when in the other position connects the second set to the translating device independently of the first set, and when in a third position connects both sets in parallel to the translating device.

In testimony whereof, I hereunto affix my signature in the presence of two witnesses.

JOHN T. LISTER.

Witnesses:
H. R. SULLIVAN,
A. F. KWIS.